US010338576B2

(12) United States Patent
Koppikar et al.

(10) Patent No.: US 10,338,576 B2
(45) Date of Patent: Jul. 2, 2019

(54) INTELLIGENT MANAGEMENT SYSTEM FOR BALANCE OF PLANT

(71) Applicant: General Electric Company, Schenectady, NY (US)

(72) Inventors: Aditi Koppikar, Bangalore (IN); Charles William Weidner, Salem, VA (US); Khantil Rajendra Shah, Bangalore (IN); Awadesh Kumar Tiwari, Bangalore (IN); Raheem Iqbal, Salem, VA (US)

(73) Assignee: General Electric Company, Schenectady, NY (US)

( * ) Notice: Subject to any disclaimer, the term of this patent is extended or adjusted under 35 U.S.C. 154(b) by 233 days.

(21) Appl. No.: 15/156,684

(22) Filed: May 17, 2016

(65) Prior Publication Data

US 2017/0336784 A1 Nov. 23, 2017

(51) Int. Cl.
*G05B 19/43* (2006.01)
*G05D 7/06* (2006.01)
*G05B 17/02* (2006.01)
*G05B 23/02* (2006.01)

(52) U.S. Cl.
CPC ............ *G05B 19/43* (2013.01); *G05B 17/02* (2013.01); *G05B 23/0229* (2013.01); *G05D 7/0676* (2013.01); *G05B 2219/24091* (2013.01); *G05B 2219/37591* (2013.01)

(58) Field of Classification Search
CPC .... G05B 19/43; G05B 23/0229; G05B 17/02; G05B 2219/37591; G05B 2219/24091; G05D 7/0676
See application file for complete search history.

(56) References Cited

U.S. PATENT DOCUMENTS

| 4,007,595 A | 2/1977 | Braytenbah et al. |
| RE29,485 E | 11/1977 | Park |
| 4,123,909 A | 11/1978 | French |

(Continued)

FOREIGN PATENT DOCUMENTS

EP 1502188 B1 7/2007

OTHER PUBLICATIONS

K.J. Åström, R.D. Bell, Drum-boiler dynamics, Automatica, vol. 36, Issue 3, 2000, pp. 363-378.*

(Continued)

*Primary Examiner* — Christopher E. Everett
(74) *Attorney, Agent, or Firm* — Eversheds Sutherland (US) LLP

(57) ABSTRACT

Systems and methods for providing intelligent management of balance of plant are provided. According to one embodiment of the disclosure, a system for determining a malfunction of a feedwater pump includes one or more processors and a database communicatively coupled to the one or more processors. The one or more processors can be configured to receive plant parameters. The one or more processors can be further configured to correlate the plant parameters to historical operational values. Based at least partially on the correlating, the one or more processors may be operable to identify a malfunction in a feedwater pump. Based at least partially on the identifying, the one or more processors may be operable to provide an advisory action concerning an operation of the feedwater pump.

28 Claims, 12 Drawing Sheets

(56) References Cited

U.S. PATENT DOCUMENTS

| | | | |
|---|---|---|---|
| RE30,589 E | 4/1981 | Park | |
| 4,619,224 A * | 10/1986 | Takita | F22D 5/30 |
| | | | 122/451 R |
| 4,854,121 A * | 8/1989 | Arii | F01K 23/108 |
| | | | 122/7 R |
| 5,042,246 A * | 8/1991 | Moore | F01D 19/00 |
| | | | 60/39.182 |
| 5,301,499 A * | 4/1994 | Kure-Jensen | F01K 23/108 |
| | | | 60/39.182 |
| 5,419,285 A * | 5/1995 | Gurevich | F22D 1/04 |
| | | | 122/406.1 |
| 5,615,996 A * | 4/1997 | Suzuki | F04D 15/0088 |
| | | | 415/1 |
| 6,993,403 B1 * | 1/2006 | Dadebo | G05B 23/0294 |
| | | | 700/108 |
| 7,793,501 B2 | 9/2010 | Narayanaswamy et al. | |
| 8,656,718 B2 | 2/2014 | Takeshita et al. | |
| 2006/0178782 A1 | 8/2006 | Pechtl et al. | |
| 2007/0084418 A1 * | 4/2007 | Gurevich | F22B 1/1815 |
| | | | 122/1 B |
| 2009/0159018 A1 * | 6/2009 | Mehendale | F01K 23/101 |
| | | | 122/451 R |
| 2010/0100248 A1 | 4/2010 | Minto et al. | |
| 2010/0126433 A1 * | 5/2010 | Kozaki | F22B 37/261 |
| | | | 122/451 R |
| 2010/0139392 A1 * | 6/2010 | Kumar | F22B 35/00 |
| | | | 73/290 R |
| 2012/0239315 A1 | 9/2012 | Baker et al. | |
| 2013/0000272 A1 * | 1/2013 | Gulen | F02C 6/18 |
| | | | 60/39.182 |
| 2013/0152586 A1 * | 6/2013 | Mishima | F01K 23/10 |
| | | | 60/641.8 |
| 2013/0311139 A1 | 11/2013 | Osmundsen et al. | |
| 2014/0142766 A1 | 5/2014 | Tiwari et al. | |
| 2015/0090202 A1 * | 4/2015 | Nenmeni | F22B 1/1815 |
| | | | 122/7 R |
| 2015/0277399 A1 * | 10/2015 | Maturana | G05B 13/042 |
| | | | 700/29 |
| 2015/0277404 A1 * | 10/2015 | Maturana | G06F 9/5072 |
| | | | 700/83 |

OTHER PUBLICATIONS

Pu Sunil, Jayesh Barve, P.S.V. Nataraj, Boiler model and simulation for control design and validation, IFAC Proceedings Volumes, vol. 47, Issue 1, 2014.*

Extended European Search Report and Opinion issued in connection with corresponding EP Application No. 17169684.2 dated Oct. 18, 2017.

* cited by examiner

| Drum Pressure 910 (psig) | Steam Flow 915 (lb/hr) | | | | | | | | | |
|---|---|---|---|---|---|---|---|---|---|---|
| | 0 | 20000 | 40000 | 60000 | 80000 | 100000 | 120000 | 140000 | 160000 | 180000 | 200000 |
| 0 | -8.98445 | -8.67282 | -8.36711 | -8.06734 | -7.77349 | -7.48558 | -7.2036 | -6.92756 | -6.65744 | -6.39326 | -6.135 |
| 100 | -8.95758 | -8.64516 | -8.33867 | -8.03811 | -7.74349 | -7.45479 | -7.17203 | -6.8952 | -6.6243 | -6.35933 | -6.10029 |
| 200 | -8.91066 | -8.59745 | -8.29018 | -7.98883 | -7.69342 | -7.40394 | -7.1204 | -6.84278 | -6.5711 | -6.30534 | -6.04552 |
| 300 | -8.84367 | -8.52968 | -8.22163 | -7.9195 | -7.6233 | -7.33304 | -7.04871 | -6.77031 | -6.49784 | -6.2313 | -5.9707 |
| 400 | -8.75663 | -8.44186 | -8.13302 | -7.83011 | -7.53313 | -7.24208 | -6.95696 | -6.67778 | -6.40453 | -6.13721 | -5.87582 |
| 500 | -8.64954 | -8.33398 | -8.02435 | -7.72066 | -7.4229 | -7.13106 | -6.84516 | -6.5652 | -6.29116 | -6.02305 | -5.76088 |
| 600 | -8.52239 | -8.20605 | -7.89563 | -7.59116 | -7.29261 | -6.99999 | -6.71331 | -6.43255 | -6.15773 | -5.88884 | -5.62589 |
| 700 | -8.37518 | -8.05805 | -7.74686 | -7.4416 | -7.14226 | -6.84886 | -6.56139 | -6.27986 | -6.00425 | -5.73458 | -5.47084 |
| 800 | -8.20792 | -7.89001 | -7.57803 | -7.27198 | -6.97186 | -6.67768 | -6.38943 | -6.10711 | -5.83072 | -5.56026 | -5.29573 |
| 900 | -8.0206 | -7.7019 | -7.38914 | -7.08231 | -6.78141 | -6.48644 | -6.1974 | -5.9143 | -5.63712 | -5.36588 | -5.10057 |
| 1000 | -7.81322 | -7.49374 | -7.18019 | -6.87258 | -6.57089 | -6.27514 | -5.98532 | -5.70143 | -5.42347 | -5.15145 | -4.88535 |
| 1100 | -7.58579 | -7.26553 | -6.95119 | -6.64279 | -6.34033 | -6.04379 | -5.75318 | -5.46851 | -5.18977 | -4.91696 | -4.65008 |
| 1200 | -7.3383 | -7.01725 | -6.70214 | -6.39295 | -6.0897 | -5.79238 | -5.50099 | -5.21553 | -4.93601 | -4.66241 | -4.39475 |
| 1300 | -7.07076 | -6.74893 | -6.43303 | -6.12306 | -5.81902 | -5.52091 | -5.22874 | -4.9425 | -4.66219 | -4.38781 | -4.11936 |
| 1400 | -6.78316 | -6.46054 | -6.14386 | -5.8331 | -5.52828 | -5.22939 | -4.93644 | -4.64941 | -4.36832 | -4.09315 | -3.82392 |
| 1500 | -6.4755 | -6.1521 | -5.83463 | -5.5231 | -5.21749 | -4.91782 | -4.62407 | -4.33626 | -4.05439 | -3.77844 | -3.50842 |
| 1600 | -6.14779 | -5.8236 | -5.50535 | -5.19303 | -4.88664 | -4.58618 | -4.29166 | -4.00306 | -3.7204 | -3.44367 | -3.17287 |
| 1700 | -5.80002 | -5.47505 | -5.15601 | -4.84291 | -4.53574 | -4.23449 | -3.93918 | -3.6498 | -3.36636 | -3.08884 | -2.81726 |

Drum Level 905 (Inches)

| Drum Pressure 910 (psig) | Steam Flow 915 (lb/hr) | | | | | | | | | |
|---|---|---|---|---|---|---|---|---|---|---|
| | 220000 | 240000 | 260000 | 280000 | 300000 | 320000 | 340000 | 360000 | 380000 | 400000 |
| 0 | -5.88268 | -5.63629 | -5.39583 | -5.16131 | -4.93271 | -4.71005 | -4.49332 | -4.28252 | -4.07765 | -3.87871 |
| 100 | -5.84719 | -5.60001 | -5.35877 | -5.12346 | -4.89408 | -4.67063 | -4.45312 | -4.24153 | -4.03588 | -3.83616 |
| 200 | -5.79163 | -5.54367 | -5.30165 | -5.06555 | -4.83539 | -4.61116 | -4.39286 | -4.18049 | -3.97405 | -3.77355 |
| 300 | -5.71602 | -5.46728 | -5.22447 | -4.98759 | -4.75664 | -4.53163 | -4.31255 | -4.09939 | -3.89217 | -3.69088 |
| 400 | -5.62036 | -5.37083 | -5.12724 | -4.88957 | -4.65784 | -4.43204 | -4.21218 | -3.99824 | -3.79023 | -3.58816 |
| 500 | -5.50464 | -5.25433 | -5.00995 | -4.7715 | -4.53899 | -4.3124 | -4.09175 | -3.87703 | -3.66824 | -3.46538 |
| 600 | -5.36886 | -5.11777 | -4.8726 | -4.63337 | -4.40007 | -4.1727 | -3.95127 | -3.73576 | -3.52619 | -3.32255 |
| 700 | -5.21303 | -4.96115 | -4.71519 | -4.47519 | -4.2411 | -4.01295 | -3.79073 | -3.57444 | -3.36408 | -3.15966 |
| 800 | -5.03714 | -4.78447 | -4.53774 | -4.29694 | -4.06207 | -3.83314 | -3.61013 | -3.39306 | -3.18192 | -2.97671 |
| 900 | -4.84119 | -4.58774 | -4.34023 | -4.09864 | -3.86299 | -3.63327 | -3.40948 | -3.19163 | -2.9797 | -2.77371 |
| 1000 | -4.62519 | -4.37096 | -4.12266 | -3.88029 | -3.64385 | -3.41335 | -3.18878 | -2.97013 | -2.75742 | -2.55065 |
| 1100 | -4.38913 | -4.13412 | -3.88503 | -3.64188 | -3.40466 | -3.17337 | -2.94801 | -2.72859 | -2.51509 | -2.30753 |
| 1200 | -4.13302 | -3.87722 | -3.62735 | -3.38341 | -3.14541 | -2.91334 | -2.68719 | -2.46698 | -2.25271 | -2.04436 |
| 1300 | -3.85685 | -3.60026 | -3.34961 | -3.10489 | -2.8661 | -2.63324 | -2.40632 | -2.18532 | -1.97026 | -1.76113 |
| 1400 | -3.56062 | -3.30325 | -3.05182 | -2.80631 | -2.56674 | -2.3331 | -2.10539 | -1.88361 | -1.66776 | -1.45785 |
| 1500 | -3.24434 | -2.98619 | -2.73397 | -2.48768 | -2.24732 | -2.01289 | -1.7844 | -1.56184 | -1.34521 | -1.13451 |
| 1600 | -2.908 | -2.64906 | -2.39606 | -2.14899 | -1.90784 | -1.67263 | -1.44336 | -1.22001 | -1.00259 | -0.79111 |
| 1700 | -2.55161 | -2.29189 | -2.0381 | -1.79024 | -1.54831 | -1.31232 | -1.08226 | -0.85813 | -0.63993 | -0.42766 |

Drum Level 905 (Inches)

FIG. 11

| Drum Pressure 910 (psig) | Steam Flow 915 (lb/hr) | | | | | | | | | |
|---|---|---|---|---|---|---|---|---|---|---|
| | 420000 | 440000 | 460000 | 480000 | 500000 | 520000 | 540000 | 560000 | 580000 | 600000 |
| 0 | -3.68571 | -3.49864 | -3.31749 | -3.14228 | -2.97301 | -2.80966 | -2.65224 | -2.50076 | -2.35521 | -2.21559 |
| 100 | -3.64237 | -3.45451 | -3.27259 | -3.09659 | -2.92653 | -2.7624 | -2.6042 | -2.45193 | -2.3056 | -2.16519 |
| 200 | -3.57898 | -3.39033 | -3.20762 | -3.03085 | -2.86 | -2.69508 | -2.5361 | -2.38305 | -2.23593 | -2.09474 |
| 300 | -3.49553 | -3.3061 | -3.12261 | -2.94504 | -2.77341 | -2.60771 | -2.44795 | -2.29411 | -2.1462 | -2.00423 |
| 400 | -3.39202 | -3.20181 | -3.01753 | -2.83918 | -2.66677 | -2.50029 | -2.33973 | -2.18511 | -2.03642 | -1.89367 |
| 500 | -3.26846 | -3.07746 | -2.8924 | -2.71327 | -2.54007 | -2.3728 | -2.21147 | -2.05606 | -1.90659 | -1.76305 |
| 600 | -3.12484 | -2.93306 | -2.74721 | -2.5673 | -2.39331 | -2.22526 | -2.06314 | -1.90695 | -1.7567 | -1.61237 |
| 700 | -2.96116 | -2.7686 | -2.58197 | -2.40127 | -2.2265 | -2.05766 | -1.89476 | -1.73779 | -1.58675 | -1.44164 |
| 800 | -2.77743 | -2.58408 | -2.39667 | -2.21518 | -2.03963 | -1.87001 | -1.70632 | -1.54857 | -1.39674 | -1.25085 |
| 900 | -2.2808 | -2.37318 | -2.47413 | -2.58362 | -2.70168 | -2.82828 | -2.96345 | -3.10717 | -3.25945 | -3.42028 |
| 1000 | -2.26208 | -2.34458 | -2.43564 | -2.53524 | -2.64341 | -2.76013 | -2.88541 | -3.01924 | -3.16163 | -3.31258 |
| 1100 | -2.22966 | -2.30227 | -2.38344 | -2.47316 | -2.57144 | -2.67827 | -2.79366 | -2.91761 | -3.05011 | -3.19116 |
| 1200 | -2.18353 | -2.24626 | -2.31753 | -2.39737 | -2.48576 | -2.5827 | -2.68821 | -2.80226 | -2.92488 | -3.05605 |
| 1300 | -2.1237 | -2.17653 | -2.23793 | -2.30787 | -2.38637 | -2.47343 | -2.56905 | -2.67322 | -2.78594 | -2.90722 |
| 1400 | -2.05016 | -2.09311 | -2.14461 | -2.20467 | -2.27328 | -2.35045 | -2.43618 | -2.53046 | -2.6333 | -2.74469 |
| 1500 | -1.96291 | -1.99597 | -2.03759 | -2.08776 | -2.14648 | -2.21377 | -2.28896 | -2.374 | -2.46695 | -2.56846 |
| 1600 | -1.86196 | -1.88513 | -1.91686 | -1.95714 | -2.00598 | -2.06337 | -2.12933 | -2.20383 | -2.28689 | -2.37851 |
| 1700 | -1.7473 | -1.76058 | -1.78242 | -1.81282 | -1.85177 | -1.89928 | -1.95534 | -2.01996 | -2.09313 | -2.17486 |

Drum Level 905
(Inches)

INTELLIGENT MANAGEMENT SYSTEM FOR BALANCE OF PLANT

TECHNICAL FIELD

This disclosure relates generally to power plants, and more particularly, to systems and methods for providing intelligent management for balance of plant.

BACKGROUND

A power plant may include numerous interconnected components and involve multiple operating processes. Inefficiencies in operation of a power plant can be caused by plant trips triggered by various conditions. For example, drum level trips can occur when a level of water in a steam drum of the heat recovery steam generator (HRSG) is lower or higher than preselected drum levels. The drum level trips can be caused by drum controls as well as adjacent systems, such as bypass valves, feedwater pumps, and so forth. Conventional techniques for preventing drum level trips can involve improving valve operations but do not provide an integrated approach.

BRIEF DESCRIPTION OF THE DISCLOSURE

The disclosure relates to systems and methods for providing intelligent management of balance of plant. Certain embodiments of the disclosure provide systems and methods for determining a malfunction of a feedwater pump. According to one embodiment of the disclosure, a system for determining a malfunction of a feedwater pump is provided. The system may include one or more processors and a database communicatively coupled to the one or more processors. The one or more processors may be configured to receive plant parameters. The one or more processors may be further configured to correlate the plant parameters to historical operational values. Based at least partially on the correlating, the one or more processors may be operable to identify a malfunction in a feedwater pump. Based at least partially on the identifying, the one or more processors may be operable to provide an advisory action concerning operation of the feedwater pump. The database may be configured to store at least the plant parameters and the historical operational values.

In another embodiment of the disclosure, a method for determining a malfunction of a feedwater pump is provided. The method may include receiving plant parameters. The method may further include correlating the plant parameters to historical operational values. Based at least partially on the correlating, a malfunction in a feedwater pump may be identified. Based at least partially on the identifying, an advisory action concerning an operation of the feedwater pump may be provided.

In another embodiment of the disclosure, a system for determining a malfunction of a feedwater pump is provided. The system may include a boiler drum and a controller. The boiler drum may include at least a steam drum, an evaporator, a riser, and a feedwater pump. The evaporator may be configured to receive water from the steam drum and heated gas from a gas turbine. The riser may be located between the evaporator and the steam drum to direct steam from the evaporator to the steam drum. The feedwater pump may be configured to provide the water to the steam drum. The controller may include one or more processors and a database communicatively coupled to the one or more processors. The one or more processors may be configured to receive plant parameters. The one or more processors may be further configured to correlate the plant parameters to historical operational values. Based at least partially on the correlating, the one or more processors may be operable to identify a malfunction in the feedwater pump. Based at least partially on the identified malfunction, the one or more processors may be operable to provide an advisory action concerning operation of the feedwater pump. The database may be configured to store at least the plant parameters and the historical operational values.

Other embodiments and aspects will become apparent from the following description taken in conjunction with the following drawings.

BRIEF DESCRIPTION OF THE DRAWINGS

FIGS. 9-11 are example lookup tables for selecting drum level setpoints, in accordance with embodiments of the disclosure.

DETAILED DESCRIPTION

Figure 1:
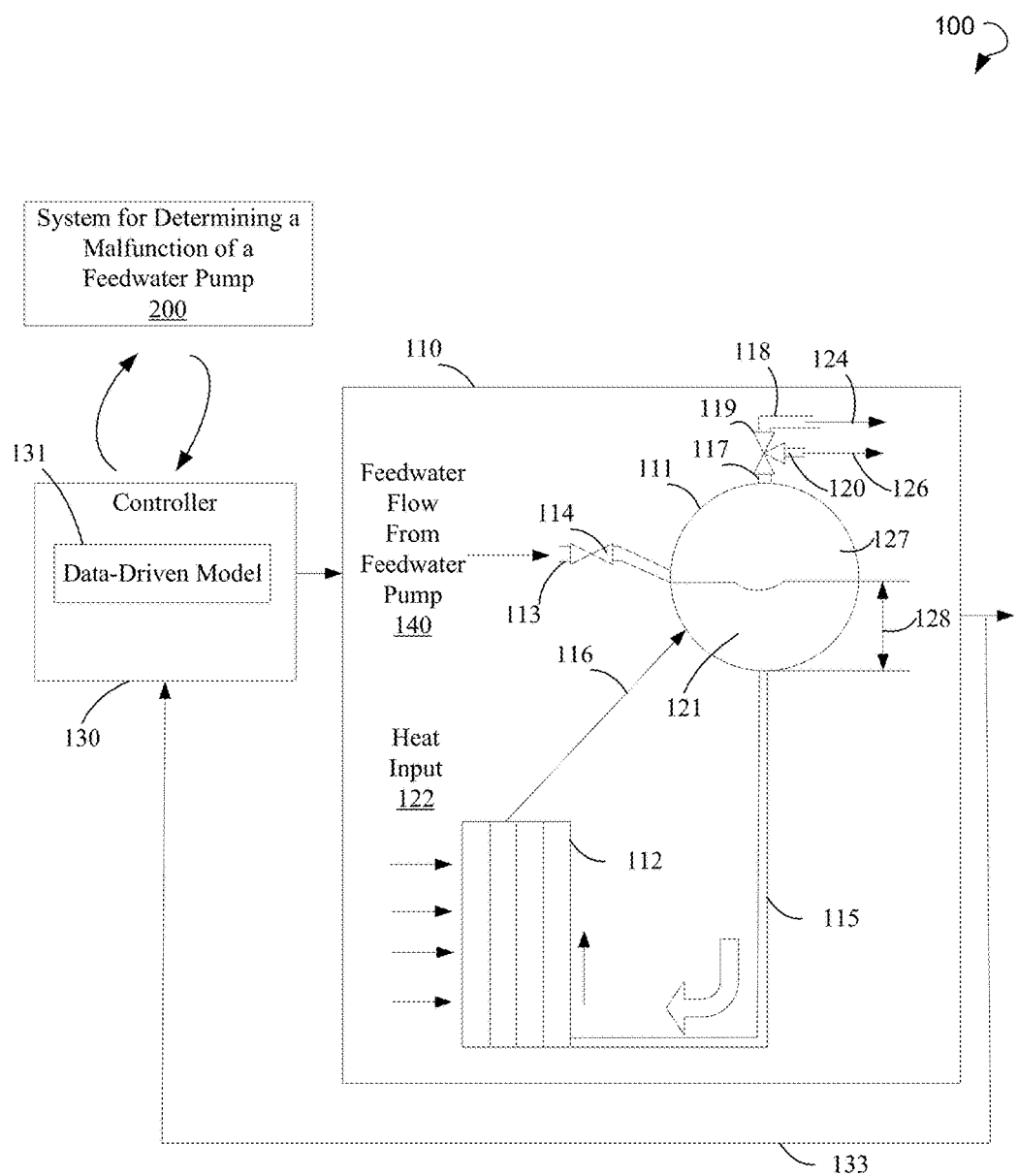
FIG. 1 is a block diagram illustrating an example system environment for implementing systems and methods for determining a malfunction of a feedwater pump, in accordance with one or more example embodiments of the disclosure.

The following detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

Certain embodiments of the disclosure described herein relate to systems and methods for providing intelligent management of balance of plant. Certain embodiments relate to systems and methods for determining malfunctions of a feedwater pump in, for instance, an industrial plant. An example method can be used as a stand-alone tool for prediction of a malfunction and choking of the feedwater pump, as well as for providing an advisory concerning managing degradations of the feedwater pump using parameters of balance of operation (BOP) equipment. The BOP equipment may include sub-systems utilized in operation of the industrial plant, such as valves, pumps, compressors, and so forth.

A power generation plant may include a gas turbine, an HRSG, and a steam turbine. In turn, the HRSG may include an economizer, an evaporator, a steam drum, and a superheater. The gas turbine can produce mechanical power and exhaust energy. The exhaust energy can be captured by the HRSG and used to convert water to steam. The water can enter the HRSG to be heated in the economizer of the HRSG. The heated water from the economizer can be sent to the evaporator that generates a saturated water mixture, which is then separated in the steam drum. The steam from the steam drum can be expanded in the steam turbine to produce additional mechanical power.

A level of water in the steam drum, also referred to as a drum level, can be relevant to providing a predetermined steam flow from the steam drum and for operation of the steam drum. Due to a decrease in the drum level, tubes inside the steam drum may be uncovered and become overheated and damaged. Additionally, an increase in the drum level may prevent separating moisture from steam in the steam drum and cause accumulation of the moisture in the steam turbine.

Example embodiments of the disclosure can be directed to gathering real-time plant parameters and creating an artificial intelligence model of the steam drum and BOP equipment. Using the artificial intelligence model, the plant parameters can be correlated to historical operational values associated with the power plant to identify a malfunction in a feedwater pump that feeds water to the steam drum, predict a transient in the steam drum, or predict a drum level setpoint. Furthermore, certain actions can be recommended to help optimize operation of the BOP equipment and minimize malfunction or degradation of the feedwater pump in the power plant.

The technical effects of certain embodiments of the disclosure may include performing predictive modelling of the operation of the HRSG in order to predict a feedwater pump malfunction and choking. The predictive modelling may utilize real-time plant parameters to help operators take proactive decisions in events of any transients or malfunctions. Further technical effects of certain embodiments of the disclosure may include ability to provide an advisory action concerning managing degradation of the feedwater pump through BOP equipment parameters. Additionally, technical effects of certain embodiments of the disclosure may include allowing management of a setpoint of a feedwater control valve and operational optimization of BOP equipment through transients and level dynamics of the steam drum. Furthermore, trip handling capability during transients may result in reduction of HRSG thermal stresses and power plant excursions.

Methods and systems of the disclosure may be applied to various classes of combined cycle plants including high pressure (HP), intermediate pressure (IP), and low pressure (LP) drums. The methods and systems may provide modifications to the distributed control system (DCS) logic to correct and/or improve steam drum control, predict feedwater pump malfunction, and provide modifications for the drum level setpoint based on the steam flow and steam pressure.

The following provides a detailed description of various example embodiments of the disclosure related to systems and methods for determining a malfunction of a feedwater pump. Because modelling operations of combined cycle power plants can be difficult due to complexity of the generation process, the disclosure is provided with reference to a combined cycle power plant. However, the systems and methods for determining a malfunction of a feedwater pump can also be applied to other configurations of power plants.

Referring now to FIG. 1, a block diagram illustrates an example system environment 100 suitable for implementing systems and methods for determining a malfunction of a feedwater pump, in accordance with one or more example embodiments. The example system environment 100 illustrates an HRSG that includes a drum boiler 110 and a controller 130. The drum boiler 110 includes a steam drum 111 and an evaporator 112 to receive water from the steam drum 111 and heated gas from a gas turbine shown as heat input 122.

The HRSG can receive exhaust energy shown as the heat input 122 from the gas turbine. Water can enter the HRSG to be heated in an economizer. The heated water from the economizer can be sent to the evaporator 112 which generates a saturated water mixture. The saturated water mixture can be separated in the steam drum 111. Dry steam can be piped to the superheater for removal of any traces of moisture and further increase of temperature. Superheated steam shown as a steam flow 124 is sent to the steam turbine to produce power that is supplied to a grid.

Water can be provided to the steam drum 111 by a feedwater pump 140 via a feedwater pipe 113 and feedwater control valve 114. The feedwater control valve 114 controls the flow of the water through the pipe to control a level of liquid water, or a level of a water/steam mixture 121, in the steam drum 111. In the disclosure, the liquid water/steam mixture 121 is made up mostly of liquid water and is differentiated from the steam that fills the portion 127 of the steam drum 111 not occupied by the liquid water/steam mixture 121. As used herein, the liquid water/steam mixture 121 may also be referred to as water 121. A drum level 128 is a level of water 121 in the steam drum 111. The evaporator 112 is heated by the heated gas, i.e. by the heat input 122, to convert water from the pipe 115 into steam. The steam is provided to the steam drum 111 via risers 116 located between the evaporator 112 and the steam drum 111, and configured to direct steam from the evaporator 112 to the steam drum 111.

The steam is output from the steam drum 111 to a steam turbine via a first pipe segment 117 and a second pipe segment 118 having a bypass valve 119 selectively connecting the first pipe segment 117 and the second pipe segment 118. One outlet of the bypass valve 119 is connected to a pipe 120 that bypasses the steam turbine and transmits the steam flow 126 to an alternate destination, such as a condenser to be recycled in the HRSG.

The operation of the HRSG may be managed through the controller 130. The controller 130 may interact with a system 200 for determining a malfunction of the feedwater pump. In particular, the controller 130 may control or regulate the water level and the steam pressure in the steam drum 111. More specifically, the controller 130 may provide a command to change a position of the feedwater control valve 114 to adjust the feed-water flow into the steam drum 111. The controller 130 may also provide a command to change a position of the bypass valve 119 to adjust the flow of steam into one or both of the second pipe segment 118 and the pipe 120. In addition, the controller 130 may command the heat input to the evaporator 112, such as by adjusting a fuel supplied to a combustor, fans, vanes or blades to control or regulate a temperature or flow of the heat input 122 to the evaporator 112.

The controller 130 can control the feedwater flow, steam flow, and heat input to the evaporator 112 based on sensor signals 133. The sensor signals 133 can be generated by sensors that measure fluid flow, steam flow, drum pressure, drum temperature, bypass position, and other parameters. The controller 130 can also control feedwater flow, steam flow, and heat input to the evaporator 112 based on gas turbine load.

The controller 130 can include a data-driven model 131 also referred herein to as an artificial intelligence model or a neural network model. The data-driven model 131 can be used to predict a malfunction of the feedwater pump 140 or control a setpoint of the drum level 128 in the steam drum 111. The data-driven model 131 can use real-time plant parameters received using the sensor signals 133 that can be generated by sensors that measure feedwater flow, feedwater pressure, feedwater pump current, steam flow, drum pressure, drum temperature, gas turbine speed, gas turbine exhaust flow, and a bypass position while the HRSG is operating. The data-driven model 131 can further use historical operational values associated with the characteristics of the steam drum 111 or other plant apparatuses. The historical operational values can be different from the real-time plant parameter and include data that has been measured in the past in the environment 100 or in other systems, and not during the present operation of the HRSG. In some example embodiments, the historical operational values may further include values associated with operation of valves including a bypass valve, a sky vent valve, an isolation valve, and so forth. In particular, the historical operational values can include data stored in memory, and not data received from sensors presently sensing conditions of the HRSG. The historical operational values can include historical steam flow, drum pressure, bypass valve position, gas turbine load, and any other historical operational values corresponding to characteristics of the HRSG affecting the level of water or a water/steam mixture in the steam drum 111.

The data-driven model 131 can be used to generate control signals to control a setpoint of the drum level 128 in the steam drum 111. The data-driven model 131 can use sensor data of the drum boiler 110 to generate the control signals.

The controller 130 can include at least one processor and memory, and the data-driven model 131 may include computer programs stored in the memory and executed on the processor. In one embodiment, the controller 130 receives measured data from the drum boiler 110 and analyzes the measured data with the data-driven model 131 to predict abnormalities in the steam drum 111 and the feedwater pump 140. In one embodiment, the controller 130 further accesses pre-stored data regarding one or more parameters and characteristics of the drum boiler 110 and historical operational values regarding steam flow, drum pressure, bypass position, and gas turbine load to generate the set-point control signals.

The controller 130 can include a single element (1E) controller, a three element (3E) controller, or any other type of controller for controlling the operation of the drum boiler 110, including the water/steam mixture 121 level in the steam drum 111. The 1E controller may receive a signal coming from a drum level sensor. This signal can be compared to a setpoint to determine a deviation value. Based on the deviation value, the controller can generate a corrective action for the feedwater valve to adjust the level of feedwater flow into the steam drum. The 3E controller may receive signals from a drum level sensor, a steam flow sensor, and a feedwater flow sensor. Based on the signals, the 3E controller may generate corrective actions for the feedwater valve or a bypass valve.

By interacting with the controller 130, the system 200 for determining a malfunction of the feedwater pump may improve a control response and reduce the likelihood of plant trips, such as drum level trips in high pressure (HP), intermediate pressure (IP), and low pressure (LP) drums. Drum level trips can be caused by the drum controls as well as adjacent systems in the power plant, such as the bypass valves, feedwater pumps, and so forth. Drum level trips may result from both high and low levels of water in the steam drum. With a high drum level, there is a concern with water carryover into the HRSG and the steam turbine. With a low drum level, there is concern with running the steam drum and the HRSG in a dry condition. The system 200 may be responsible for ensuring that the controller 130 functions suitably and may predict malfunction or degradation of the feedwater pump and provide a modification of the drum level setpoint based on the steam flow and the steam pressure.

Figure 2:
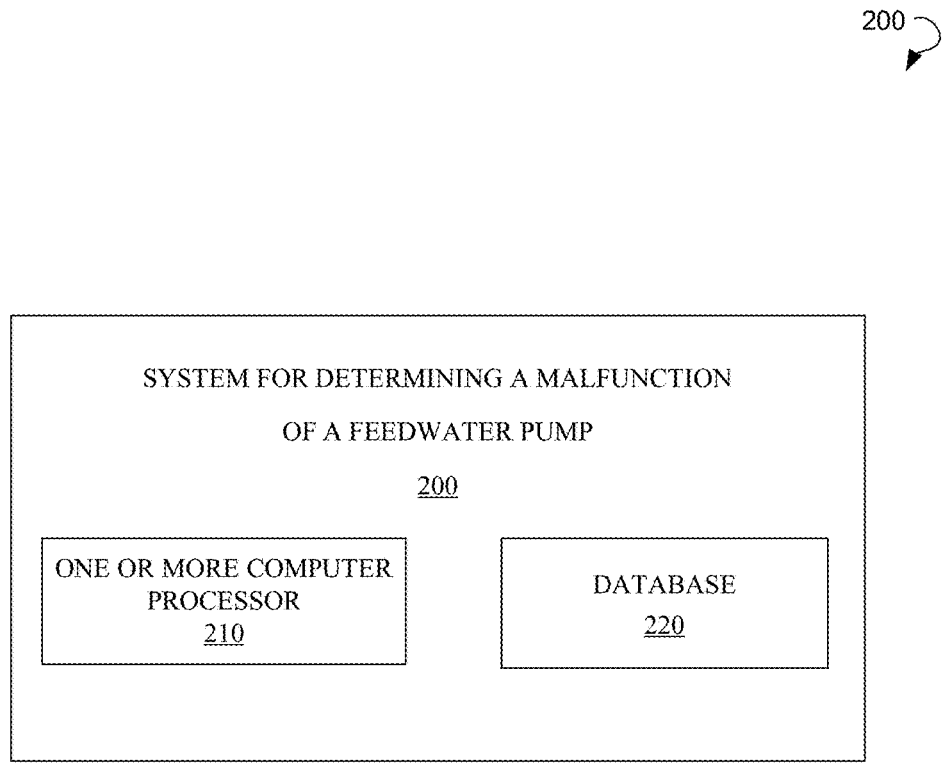
FIG. 2 is a block diagram illustrating various example modules of a system for determining a malfunction of a feedwater pump, in accordance with one or more example embodiments of the disclosure.

FIG. 2 is block diagram illustrating various example modules of the system 200 for determining a malfunction of a feedwater pump, in accordance with certain embodiments of the disclosure. The system 200 may include one or more computer processors 210 and a database 220. The one or more computer processors 210 can be part of a central processing unit or another external device. The one or more computer processors 210 can include a programmable processor, such as a microcontroller, a central processing unit, and so forth. In other embodiments, the one or more computer processors 210 can include an application-specific integrated circuit or a programmable logic array, such as a field programmable gate array, designed to implement the functions performed by the system 200. The database 220 can be operable to receive and store plant performance parameters and/or historical operational values. The operations performed by the system 200 are described in detail on FIG. 3.

Figure 3:
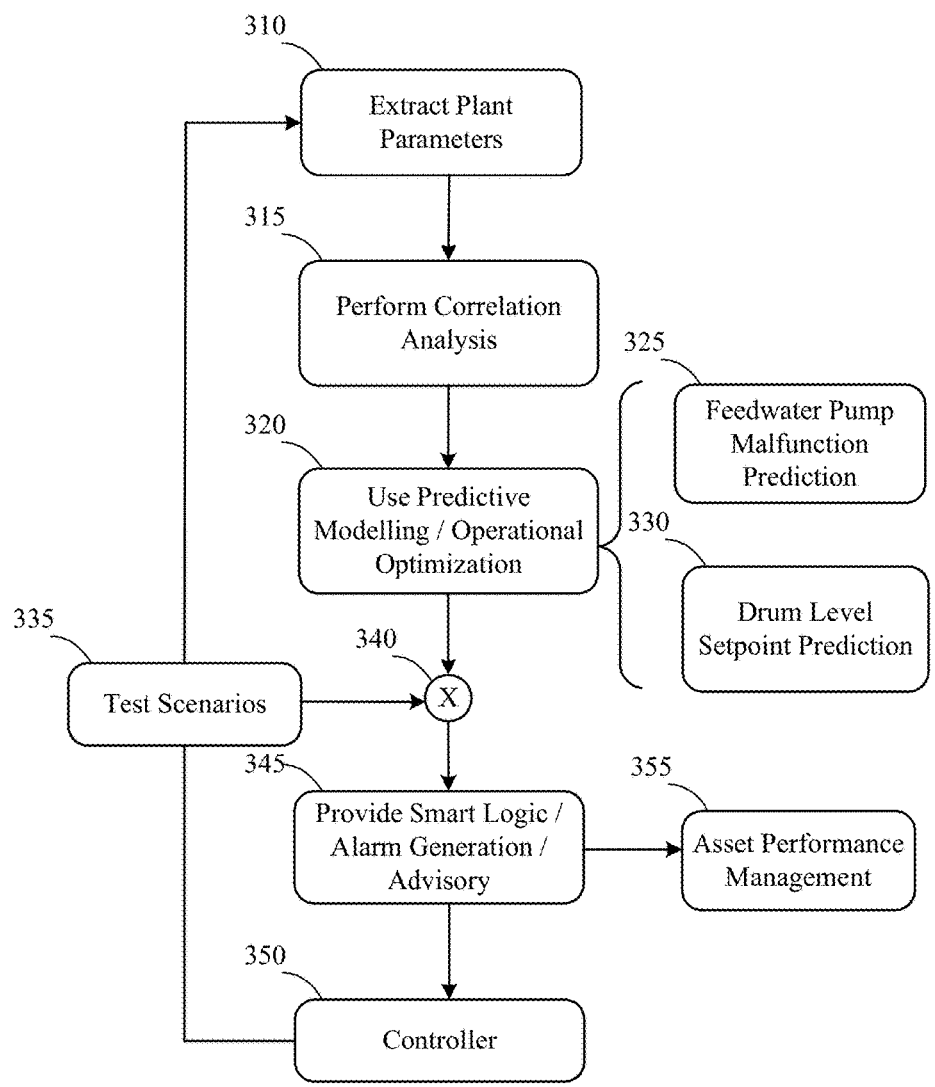
FIG. 3 is an example block diagram illustrating an intelligent management of a power plant by a system for determining a malfunction of a feedwater pump, in accordance with one or more example embodiments of the disclosure.

FIG. 3 is an example block diagram 300 illustrating an intelligent management of a power plant by the system for determining a malfunction of a feedwater pump shown on FIG. 2, in accordance with an embodiment of the disclosure. As shown on FIG. 3, a processor of the system for determining a malfunction of a feedwater pump may extract real-time plant parameters at block 310. The real-time plant parameters may include plant operating data including gas turbine parameters and parameters associated with secondary components, such as a position of a bypass valve, a condition of a feedwater pump, and so forth. Additionally, parameters associated with drum geometry may be used. The processor may also access a database to obtain historical operational values associated with the power plant. At block 315, the processor may perform a correlation analysis by correlating the real-time plant parameters and the historical operational values. Based on the correlation analysis, the processor may build a multivariate data-driven model of operation of the steam drum. In other words, the multivariate data-driven model may be used to parameterize equipment associated with the power plant and power plant processes, and utilize the parameters that impact the drum level and the flow of the feedwater pump to predict abnormalities in the steam drum and the feedwater pump.

Based on the multivariate data-driven model, the processor may perform predicative modelling and/or operational optimization at block 320. More specifically, every time there is an excursion or deviation of the current plant parameters from the data obtained based on the correlation analysis, the processor can identify or predict, at block 325, malfunctions or choking that can occur in the feedwater pump. Furthermore, the multivariate data-driven model may be used to determine, at block 330, a drum level setpoint and a feedwater control valve setpoint needed to prevent transients (e.g., shrinking and swelling) in the steam drum and drum level dynamics. A transient of the steam drum is a change in the one or both of drum level or drum pressure in the steam drum.

Additionally, the multivariate data-driven model may be used to determine an input flow into the feedwater pump and an output flow of the feedwater pump, as well as to determine whether the feedwater pump is failing, whether another redundant feedwater pump is needed to be used instead of the feedwater pump to prevent failures in the steam drum, whether the bypass valve needs to be open to an open position so that water may be let out to avoid swelling of the steam drum, and so forth.

Based on the determination of a malfunction occurring in the feedwater pump, the processor may proactively provide optimization techniques for the overall balance of plant equipment of the power plant. In particular, based on the predictive modelling and predetermined test scenarios 335, at block 340 the processor may select proactive actions to be taken to avoid abnormalities and/or malfunctions in the steam drum and the feedwater pump and enable improved flexibility in plant operation. The proactive actions may include providing, at block 345, an advisory action for a plant operator on managing the malfunction and/or degradation of the feedwater pump through BOP equipment parameters. The advisory action may include providing the plant operator with optimal plant settings associated with control logic for the BOP equipment. In example embodiments, the BOP equipment may be located downstream of the steam drum. In particular, the processor may determine parameter settings for the BOP equipment to optimize the operational performance of the BOP equipment and prevent the dynamics of the BOP equipment based on the predicted transients and level dynamics of the steam drum. The current feedwater pump performance and the parameter settings may be output to the plant operator via an application programming interface (API) to perform an asset performance management at block 355. Block 345 may further include generating an alarm for the plant operator to notify about the predicted malfunction.

Block 345 further includes providing a smart logic on controlling current plant parameters. The smart logic may be provided to a controller at block 350. The controller may utilize the smart logic and the test scenarios 335 associated with the operation of the power plant to control current plant parameters by controlling the operation of the BOP equipment.

Figure 4:
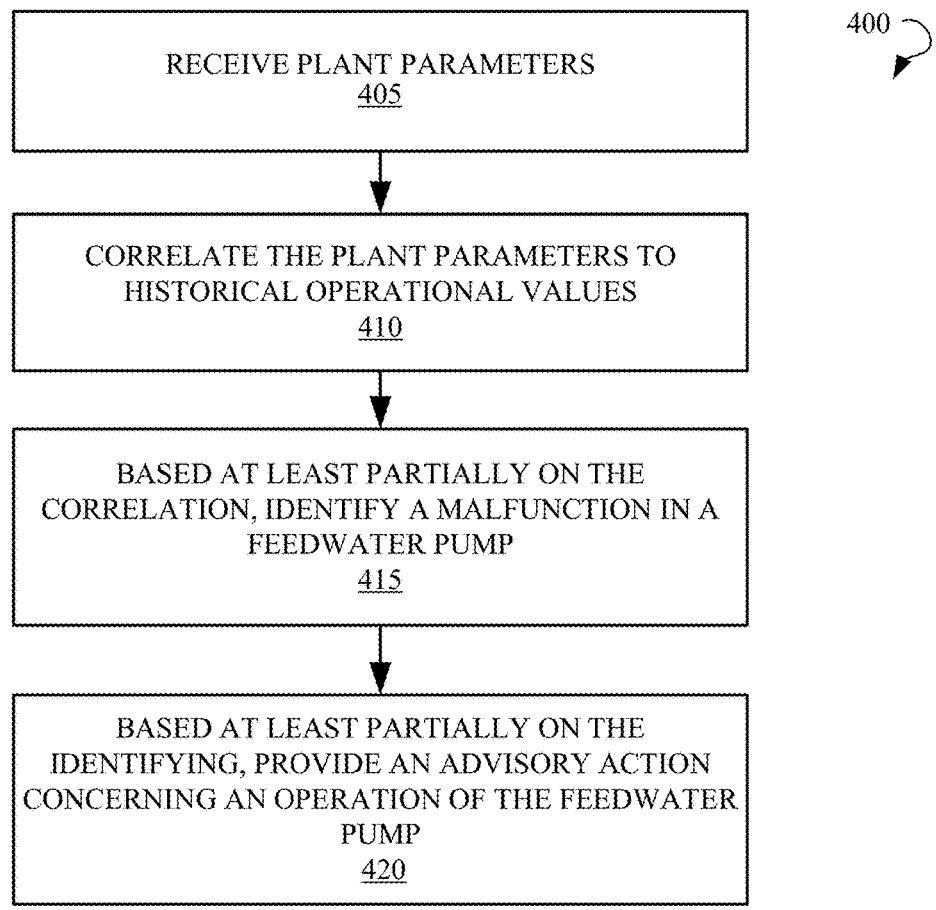
FIG. 4 is a process flow diagram illustrating an example method for determining a malfunction of a feedwater pump, in accordance with an embodiment of the disclosure.

FIG. 4 depicts a process flow diagram illustrating an example method 400 for determining a malfunction of a feedwater pump, in accordance with an embodiment of the disclosure. The method 400 may be performed by processing logic that may comprise hardware (e.g., dedicated logic, programmable logic, and microcode), software (such as software run on a general-purpose computer system or a dedicated machine), or a combination of both. In one example embodiment, the processing logic resides at a controller 1200 shown on FIG. 12, which may reside in a user device or in a server. The controller 1200 may comprise processing logic. It will be appreciated by one of ordinary skill in the art that instructions said to be executed by the controller 1200 may, in fact, be retrieved and executed by one or more processors. The controller 1200 may also include memory cards, servers, and/or computer disks. Although the controller 1200 may be configured to perform one or more steps described herein, other control units may be utilized while still falling within the scope of various embodiments.

As shown in FIG. 4, the method 400 may commence at operation 405 with receiving plant parameters. In an example embodiment of the disclosure, the plant parameters may be associated with a power plant, such as a gas power plant, a steam power plant, a combined cycle power plant, and so forth. The components of the power plant may include a gas turbine, a steam turbine, a generator, a condenser, a superheater, an evaporator, a steam drum, an economizer, a reheater, a valve, a controller, a pipe, a feedwater pump, a pre-heater, a fuel heater, a flow splitter, a flow mixer, an attemperator, a duct burner, a selective catalytic reduction unit, a steam condenser, a condenser hot well, and so forth. The plant parameters may be received from sensors associated with the power plant. Furthermore, historical operational values may be received from the controller, which collects or stores data associated with operational values, or from other sources.

At operation 410, the plant parameters may be correlated to the historical operational values. At operation 415, identify a malfunction in a feedwater pump based on the correlation of the plant parameters to the historical operational values. Additionally, a choking of the feedwater pump may be predicted based on the correlation.

Additionally, based on the plant parameters, a drum pressure and a steam flow associated with a steam drum may be predicted. Based on the drum pressure and the steam flow, a drum level in the steam drum may be predicted. Upon prediction of the drum level, a drum level setpoint of the steam drum may be determined based on the drum level. The drum level setpoint may be adjusted by controlling one or more adjacent components, such as a bypass valve, the feedwater pump, and other components of the BOP equipment. The adjustment of the drum level setpoint may be performed during one of the following periods of operation of the power plant: an initial steam drum streaming (e.g., during a startup of the power plant), transients (e.g., shrinking and swelling) in the steam drum, load maneuvering of a gas turbine (e.g., a fast rump), operation of a duct burner, and so forth.

In example embodiments, the method 400 may further include predicting transients in the steam drum based on the plant parameters. The determining of the drum level setpoint may be further based on the predicted transients. Additionally, a feedwater control valve setpoint of the drum level may be determined and managed based on predicted transients and drum level dynamics.

The method 400 may continue with providing an advisory action concerning an operation of the feedwater pump at operation 420. The advisory action may be provided based on the identification of the malfunction in the feedwater pump. In an example embodiment, the advisory action may include at least one of the following: changing parameters of the BOP equipment, changing an input flow of the feedwater pump, changing an output flow of the feedwater pump, providing a redundant feedwater pump, changing a position of a bypass valve, and so forth. The advisory action may be provided for operation of other adjacent systems. For example, an inlet pressure control setpoint may be tracked for multi-unit gas turbine (GT)/HRSG trains that feed a single steam turbine to reduce the steam pressure transient occurring in the GT/HRSG train when there is a trip of a sister GT/HRSG train. Additionally, an autoblend may be provided for multi-unit GT/HRSG trains where steam flow and pressure transients are reduced when blending a GT/HRSG train to an already connected GT/HRSG train. In example embodiments, pre-positioning of the bypass valve may be provided in the event of load rejection of the steam turbine or the GT/HRSG trip. In further example embodiments, the feedwater pump may be transferred from a primary pump to a backup pump and feedwater pressure control may be provided.

The advisory action may be used to improve plant robustness to transients and reduce the likelihood of drum level trips. In some embodiments, drum level trips may be reduced by at least by about 10-50%. Furthermore, the advisory action aimed at minimization of drum dynamics and preventing transients in the steam drum may further lead to reduction of drum level swings, enhanced operability of the power plant, increased combine cycle efficiency, improved reliability and reduced cost of the power plant, reduced thermal stress of the HRSG, reduction in plant excursions, improved trip handling during transients, and so forth.

Additionally, based on identification of the malfunction in the feedwater pump, an alarm may be issued to notify a plant operator on the malfunction. The alarm may be provided to a plant operator via an API. Additionally, current plant parameters and the advisory action may be displayed to the operator via the API.

In an example embodiment, upon receipt of the advisory action, the plant operator may review plant operating data, drum control logic, and proportional-integral-derivative (PID) controller control and produce one or more of the following: logic adjustments for the DCS, parameterization for the drum pressure and the steam flow, customer review of the adjustments being planned, commissioning documents, a data list for data recording by monitoring and diagnostic systems, and so forth.

Figure 5:
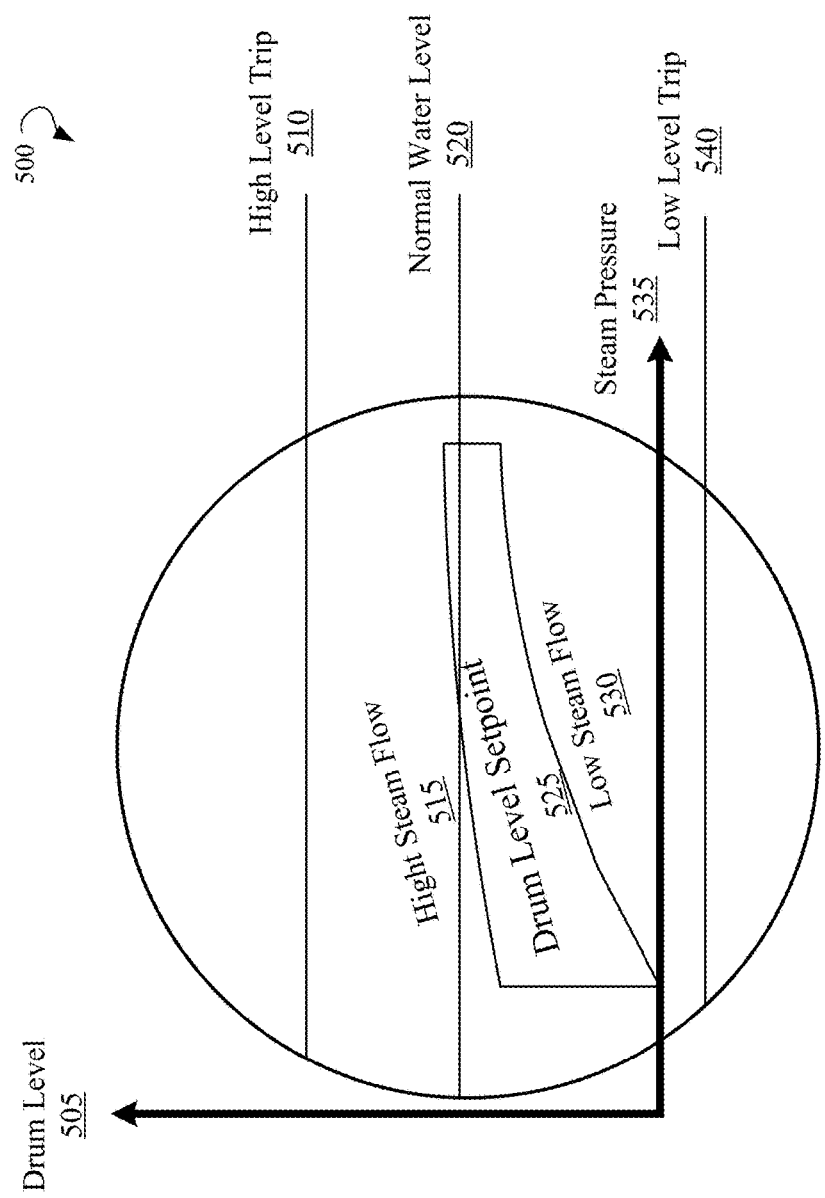
FIG. 5 is an example graph illustrating a drum level setpoint as a function of a steam flow and a steam pressure, in accordance with an embodiment of the disclosure.

FIG. 5 is an example schematic diagram 500 of a drum level setpoint as a function of a steam flow and a steam pressure according to an embodiment of the disclosure. As shown on FIG. 5, a horizontal axis refers to a steam pressure 535, a vertical axis refers to a drum level 505 in a steam drum. A controller may provide three states for a function of enabling or disabling a selection for the modification of the drum level setpoint, namely 'Enabled and Active' state, 'Enabled and not Active' state (in case of a low quality of either steam flow or steam pressure measurement), and 'Disabled' state.

The goal for deriving the drum level setpoint from the steam flow and the steam pressure is to manage the initial steam flows and associated swelling as well as secondary effect transients that may occur later. As shown on FIG. 5, a low steam flow 530 is a lower boundary of a drum level setpoint 525 and is used in power plants to handle the initial swelling. A high steam flow 515 is an upper boundary of the drum level setpoint 525 and is set by post swelling settling point and is needed to ensure an adequate volume of steam to handle the loss of the primary feedwater pump and the transfer to the backup feedwater pump. A high level trip 510, a normal water level 520, and a low level 540 trip as well as swelling of the steam drum may be determined for the power plant. In addition, loss of volume at expected steam flow may be determined. Typically, about 90 seconds may be allocated on the power plant for the transfer from a primary feedwater pump to a backup feedwater pump.

Based on the multivariate data-driven model, the controlling of the steam drum may be analyzed. For example, a steam flow and a feedwater flow may be analyzed at a steady state for sensor calibration comparison. Furthermore, a drum level compensation may be provided, which is not performed properly by conventional controlling systems. In particular, the drum level compensation calculated based on the multivariate data-driven model may be compared to the drum level compensation provided by a distributed control system (DCS). Furthermore, the expected swelling may be correlated to the observed swelling to determine the swelling as a function of heat input, drum pressure, initial water level, economizer temperature, and drum metal temperature. The predicted drum level dynamics may also help to reduce thermal stresses of the HRSG and plant excursions by having improved trip handling capability during transients.

Figure 6:
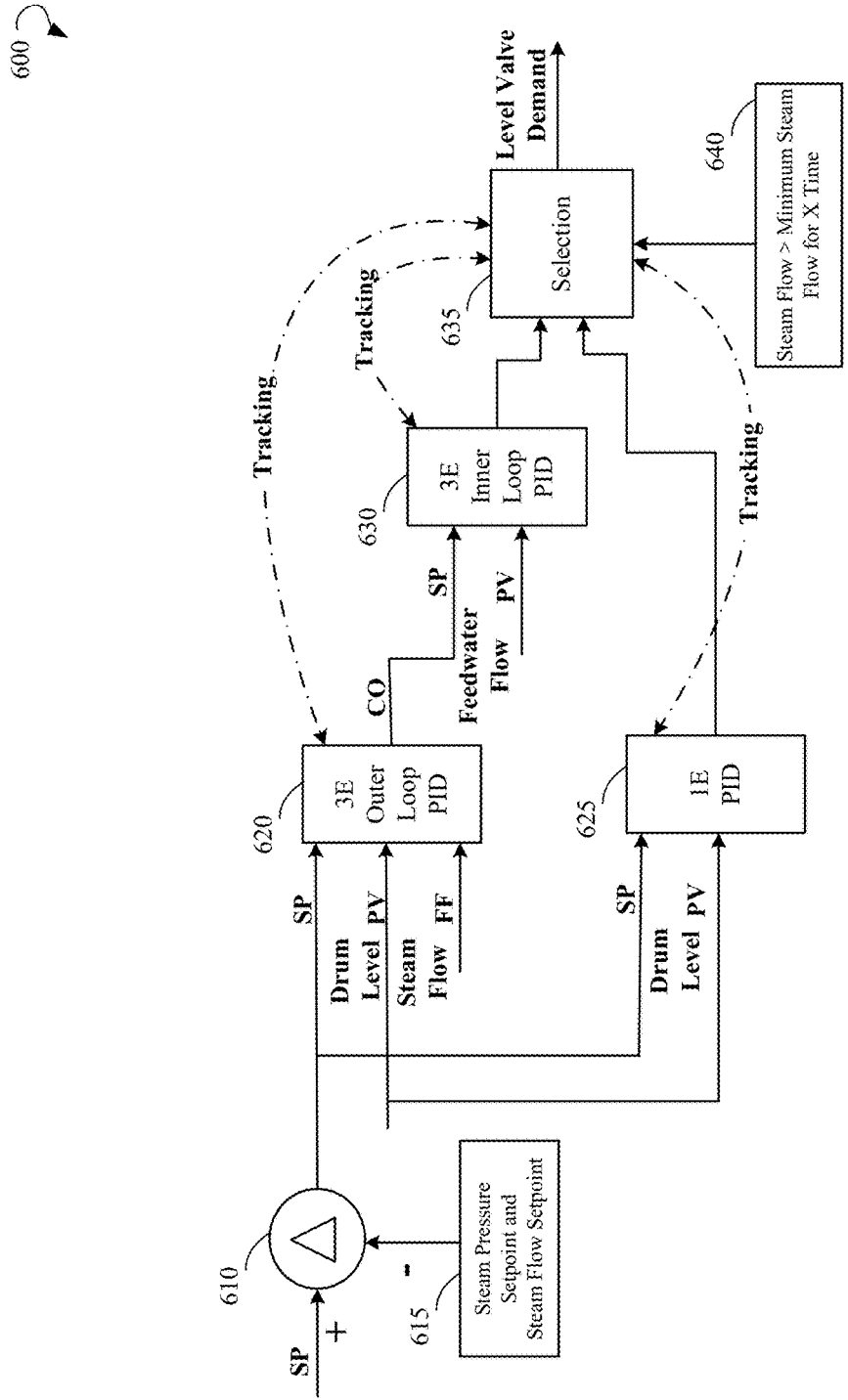
FIG. 6 is an example block diagram illustrating controlling a drum level, in accordance with an embodiment of the disclosure.

FIG. 6 shows an example schematic diagram 600 for controlling a drum level by 1E/3E controllers according to an embodiment of the disclosure. The existing control logic of the steam drum provided by the DCS may be evaluated and corrected as required. The 1E/3E controller may include a 1E/3E PID controller, also referred herein to as a PID controller. The PID controller may continuously calculate an error value as the difference between a desired setpoint and a measured process variable. The PID controller minimizes the error value over time by adjusting a control variable, such as by adjusting the parameters of the feedwater pump, bypass valve, and other BOP equipment. As shown on FIG. 6, an input block 610 receives a preset setpoint (SP) and process variables (PV) shown at block 615, such as drum pressure setpoints and steam flow setpoints. 1E PID controller 625 receives the setpoint (SP) and process variables (PV) and determines a drum level. The 3E outer loop PID controller 620 receives the setpoint (SP) and process variables (PV) and determines the drum level, as well as receives a feed forward (FF) value and determines a steam flow. The 3E outer loop PID controller 620 provides a control output (CO) to the 3E inner loop PID controller 630. The 3E inner loop PID controller 630 determines a feedwater flow based on the setpoint (SP) and process variables (PV). Data determined by the 1E PID controller 625, the 3E outer loop PID controller 620, and the 3E inner loop PID controller 630 are continuously tracked and are used in a selection block 635 to perform a selection of a level demand for a feedwater control valve to adjust the current drum level. The selection block 635 may receive data from block 640 setting that the steam flow is higher than a minimum steam flow for a predetermined time.

The systems and methods of the disclosure may be used as a performance enhancer for 1E/3E PID controller. In particular, tracking of configuration between the 1E PID controller and 3E PID controller by transferring data between 1E PID controller and 3E PID controller may be bumpless both in and out of 3E PID controller. A flow transfer point to 3E PID controller may be at a point where sufficient flow is present for control (based on a flow transmitter range) and may avoid an operating point where the plant transients can cause transfers in/out of 3E PID controller. Furthermore, additional PID controllers may be provided for limiting the feedwater flow, and the tracking may include tracking of the additional PID controllers.

Range valve characterization may be split as the valves may be not flow characterized properly and transients in the steam flow may occur during the transition from a small valve to a large valve and from a large valve to a small valve. Gains provided by the PID controller may need to be adjusted and gain scheduling may be examined to avoid plant instability.

Figure 7:
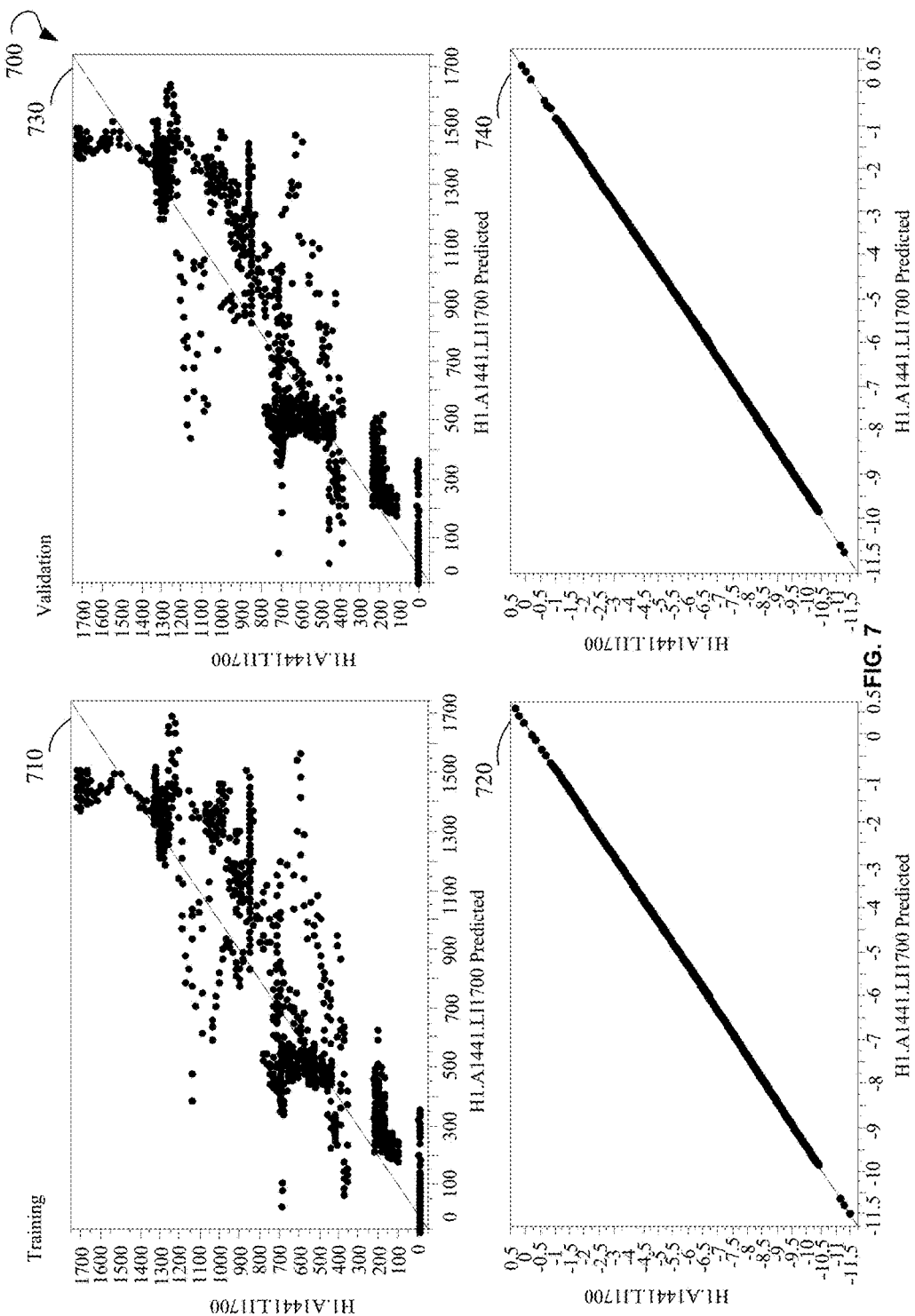
FIG. 7 are example graphs illustrating prediction of a drum level setpoint, in accordance with an embodiment of the disclosure.
Figure 8:
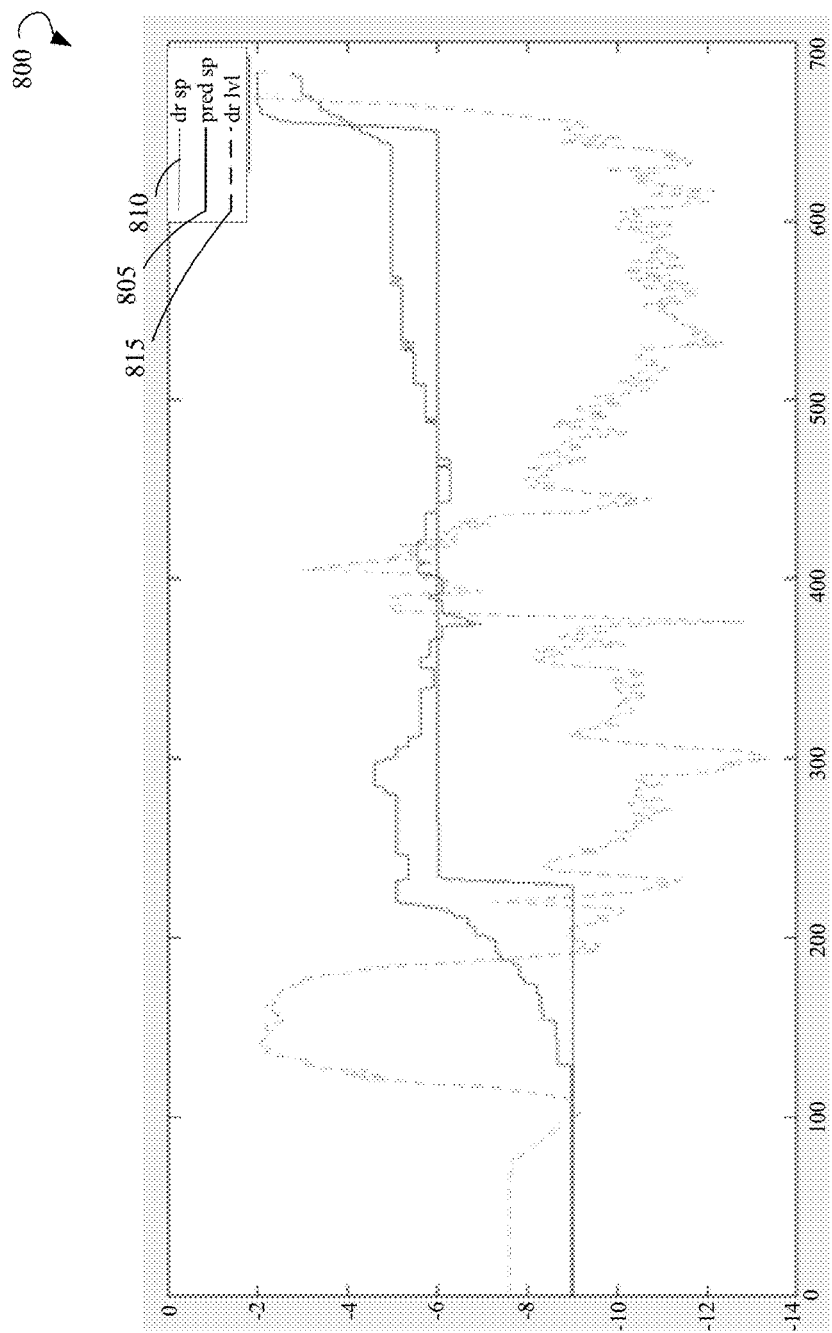
FIG. 8 is an example graph illustrating a setpoint predicted based on a drum pressure and a drum level using a data-driven model, in accordance with an embodiment of the disclosure.

FIG. 7 shows example diagrams 700 for prediction of a drum level setpoint according to an embodiment of the disclosure. Diagrams 710 and 720 represent values obtained during a training step when real-time plant values were received. Diagrams 730 and 740 show values validated based on the data-driven model. FIG. 8 is an example diagram 800 illustrating a drum level setpoint 805 predicted based on a current drum level setpoint 810 and a drum level 815 using the data-driven model according to an embodiment of the disclosure. FIGS. 9-11 illustrate example lookup tables 900, 1000, and 1100, respectively, according to certain embodiments of the disclosure. The lookup tables 900, 1000, and 1100 may be used to select a setpoint for a drum level 905 based on a drum pressure 910 and a steam flow 915.

Figure 12:
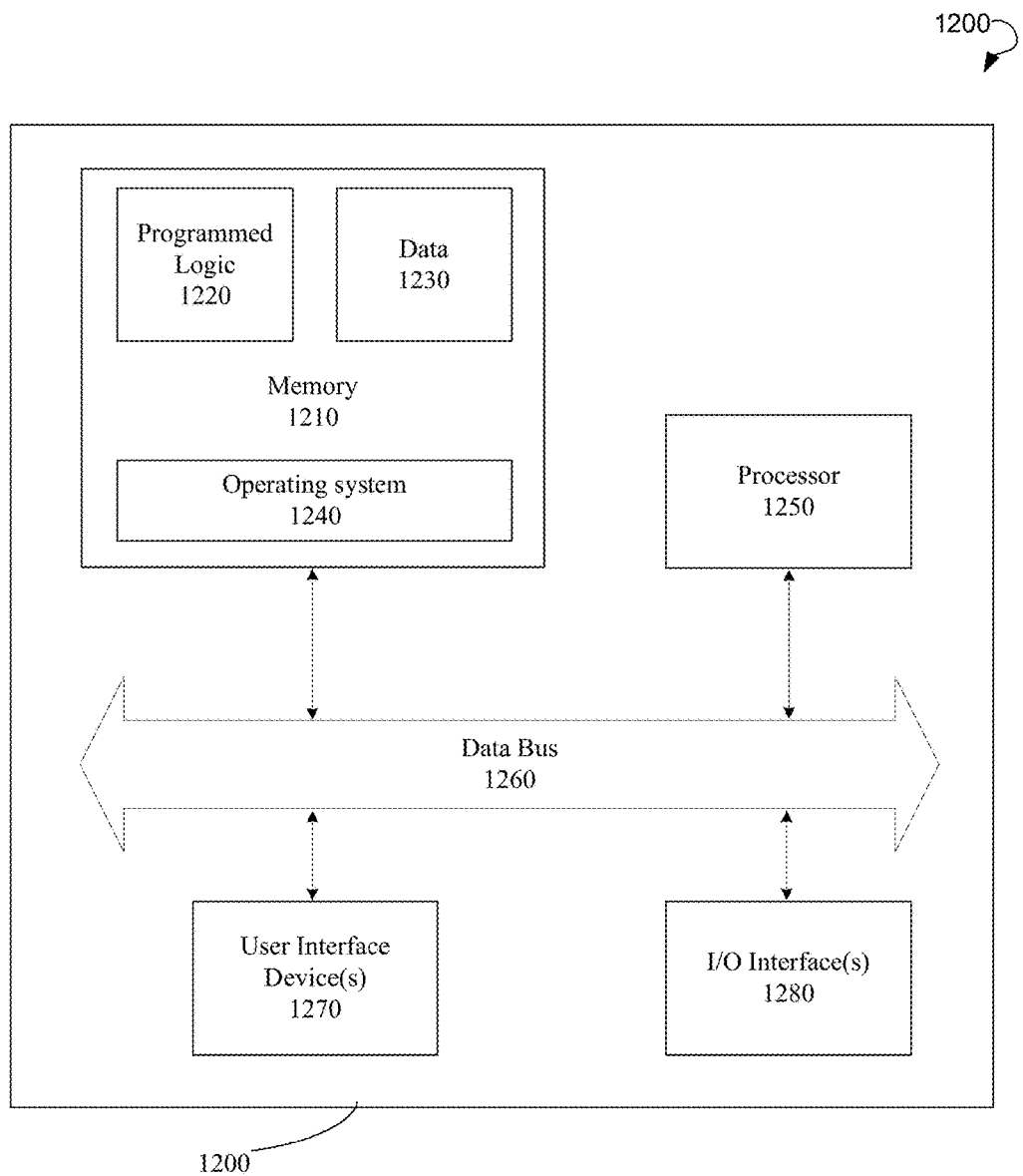
FIG. 12 is a block diagram illustrating an example controller for intelligent management system for balance of plant, in accordance with an embodiment of the disclosure.

FIG. 12 depicts a block diagram illustrating an example controller 1200 for simulation and optimization of operations of power plant, in accordance with an embodiment of the disclosure. More specifically, the elements of the controller 1200 may be used to simulate and optimize operations of the power plant. The controller 1200 may include a memory 1210 that stores programmed logic 1220 (e.g., software) and may store data 1230, such as geometrical data and the operation data of a power plant, a dynamic model, performance metrics, and the like. The memory 1210 also may include an operating system 1240.

A processor 1250 may utilize the operating system 1240 to execute the programmed logic 1220, and in doing so, may also utilize the data 1230. A data bus 1260 may provide communication between the memory 1210 and the processor 1250. Users may interface with the controller 1200 via at least one user interface device 1270, such as a keyboard, mouse, control panel, or any other devices capable of communicating data to and from the controller 1200. The controller 1200 may be in communication with the power plant online while operating, as well as in communication with the power plant offline while not operating, via an input/output (I/O) interface 1280. More specifically, one or more of the controllers 1200 may carry out the execution of the model-based control system, such as, but not limited to, receive geometrical data and operational data associated with components of the power plant, create a dynamic model of the power plant for components based on the geometrical data and the operation data, generate a surrogate model for a specific performance metric based on the dynamic model, incorporate the surrogate model into an optimization procedure, and exercise the optimization procedure under an optimization objective to optimize operations of the power plant for the specific performance metric. Additionally, it should be appreciated that other external devices or multiple other power plants may be in communication with the controller 1200 via the I/O interface 1280. In the illustrated embodiment, the controller 1200 may be located remotely with respect to the power plant; however, it may be co-located or even integrated with the power plant. Further, the controller 1200 and the programmed logic 1220 implemented thereby may include software, hardware, firmware, or any combination thereof. It should also be appreciated that multiple controllers 1200 may be used, whereby different features described herein may be executed on one or more different controllers 1200.

Accordingly, certain embodiments described herein can allow for constrained, multi-objective simulation and optimization of operations of a power plant. The multi-objective optimization may be accomplished through the use of surrogate models in order to satisfy the function call requirements. However, the dynamic simulation of the power plant may also be executed in a time-efficient manner, i.e. on the order of minutes, in order to generate the data to regress. Due to the dynamic simulation of the power plant operation, optimal operation of the power plants may be achieved. Additionally, time history of performance metrics within the power plant may be predicted under a variety of operating conditions.

References are made to block diagrams of systems, methods, apparatuses, and computer program products according to example embodiments. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a non-transitory, computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide operations for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and the like.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A method for determining and responding to a malfunction of a feedwater pump, the method comprising:
    receiving, by one or more computer processors, real-time plant parameters;
    correlating, by one or more computer processors, the plant parameters to historical operational values;
    based at least partially on the correlating, identifying, by one or more computer processors, that a malfunction in a feedwater pump may occur;
    prior to the malfunction in the feedwater pump occurring, based at least partially on the plant parameters, predicting, by one or more computer processors, at least a drum pressure and a steam flow associated with a steam drum;
    prior to the malfunction in the feedwater pump occurring, based at least partially on the drum pressure and the steam flow, predicting, by one or more computer processors, a drum level in the steam drum;
    prior to the malfunction in the feedwater pump occurring, based at least in part on a predicted drum level, determining at least a high level drum setpoint and a low level drum setpoint; and
    prior to the malfunction in the feedwater pump occurring, based at least partially on the identifying, controlling operation of a bypass valve or a second feedwater pump.

2. The method of claim 1, further comprising:
    based at least partially on the drum level, determining, by one or more computer processors, a drum level setpoint of the steam drum; and
    based at least partially on the drum level, determining, by one or more computer processors, a feedwater control valve setpoint.

3. The method of claim 2, further comprising adjusting the drum level setpoint, wherein the adjusting includes controlling of one or more adjacent components, the adjacent components comprising at least one of the following: a bypass valve or the feedwater pump.

4. The method of claim 2, wherein the adjusting the drum level setpoint is performed during at least one of the following: an initial steam drum streaming, pressure transients in the steam drum, load maneuvering of a plant, or operation of a duct burner.

5. The method of claim 2, further comprising, based at least partially on the plant parameters, predicting, by one or more computer processors, a transient in the steam drum, wherein the determining of the drum level setpoint is further based on the predicting of the transient.

6. The method of claim 1, further comprising, based on the identification of the malfunction in the feedwater pump, issuing, by one or more computer processors, an alarm.

7. The method of claim 6, further comprising, providing, by one or more computer processors, the alarm to a plant operator via an application programming interface.

8. The method of claim 1, further comprising, based at least partially on the correlating, predicting, by one or more computer processors, a choking of the feedwater pump.

9. The method of claim 1, wherein the advisory action comprises at least one of the following: changing parameters of balance of plant equipment, changing an input flow of the feedwater pump, changing an output flow of the feedwater pump, providing a redundant feedwater pump, or changing a position of a bypass valve.

10. A system for determining a malfunction of a feedwater pump, the system comprising:
    one or more computer processors operable to:
        receive, real-time plant parameters;
        correlate the plant parameters to historical operational values;
        based at least partially on the correlating, identify that a malfunction in a feedwater pump may occur; and
        prior to the malfunction occurring in the feedwater pump, based at least partially on the identifying, control operation of a bypass valve or a second feedwater pump; and
    a database operable to store at least the plant parameters and the historical operational values.

11. The system of claim 10, wherein the one or more computer processors are further operable to:
    based at least partially on the plant parameters, predict at least a drum pressure and a steam flow associated with a steam drum; and
    based at least partially on the drum pressure and the steam flow, predict a drum level in the steam drum.

12. The system of claim 11, wherein the one or more computer processors are further operable to be based at least partially on the drum level, determine a drum level setpoint to adjust the drum level to achieve predetermined dynamics of the steam drum.

13. The system of claim 12, wherein the one or more computer processors are further operable to control at least one of adjacent units, wherein the adjacent units comprise at least one of the following: a bypass valve or the feedwater pump.

14. The system of claim 12, wherein the one or more computer processors are operable to adjust the drum level setpoint during one or more of the following: an initial steam drum streaming, pressure transients in the steam drum, load maneuvering of a plant, and operation of a duct burner.

15. The system of claim 10, wherein the plant parameters include at least an exhaust temperature, a gas turbine exhaust flow, a feedwater temperature, a feedwater pressure, a feedwater flow, a drum superheater temperature, a bypass valve position, a feedwater pump condition, a gas turbine speed, a stream flow from a steam drum, and a drum pressure in the steam drum.

16. The system of claim 10, wherein the one or more computer processors are further operable to:
    based on the identification of the malfunction in the feedwater pump, issue an alarm; and
    provide the alarm and the advisory action to a plant operator via an application programming interface.

17. The system of claim 10, wherein the advisory action is provided for an equipment located downstream to a steam drum.

18. The system of claim 10, wherein the advisory action includes at least one of the following: changing parameters of balance of plant equipment, changing an input flow of the feedwater pump, changing an output flow of the feedwater pump, providing a redundant feedwater pump, or changing a position of a bypass valve.

19. A system for determining a malfunction of a feedwater pump, the system comprising:
one or more computer processors operable to:
receive real-time plant parameters;
correlate the plant parameters to historical operational values;
based at least partially on the correlating, identify that a malfunction could occur in a feedwater pump;
prior to the malfunction occurring in the feedwater pump, based at least partially on the identifying, provide an advisory action concerning an operation of the feedwater pump;
prior to the malfunction occurring in the feedwater pump, based at least partially on the plant parameters, predict at least a drum pressure and a steam flow associated with a steam drum;
prior to the malfunction occurring in the feedwater pump, based at least partially on the drum pressure and the steam flow, predict a drum level in the steam drum;
prior to the malfunction occurring in the feedwater pump, based at least partially on the drum level, determine a drum level setpoint to adjust the drum level to achieve predetermined dynamics of the steam drum;
prior to the malfunction occurring in the feedwater pump, based at least partially on the identifying, control operation of a bypass valve or a second feedwater pump; and
a database operable to store at least the plant parameters and the historical operational values.

20. A system for determining a malfunction of a feedwater pump, the system comprising:
a drum boiler including a steam drum, an evaporator to receive water from the steam drum and a heated gas from a gas turbine, a riser disposed between the evaporator and the steam drum to direct steam from the evaporator to the steam drum, and a feedwater pump to provide the water to the steam drum; and
a controller including one or more processors and a database, wherein the one or more processors are operable to:
receive real-time plant parameters;
correlate the plant parameters to historical operational values;
based at least partially on the correlating, identify that a malfunction could occur in a feedwater pump; and
prior to the malfunction occurring in the feedwater pump, based at least partially on the identifying, control operation of a bypass valve or a second feedwater pump; and
wherein the database is operable to store at least the plant parameters and the historical operational values.

21. The system of claim 20, wherein the one or more computer processors are further operable to:
based at least partially on the plant parameters, predict at least a drum pressure and a steam flow associated with a steam drum; and
based at least partially on the drum pressure and the steam flow, predict a drum level in the steam drum.

22. The system of claim 21, wherein the one or more computer processors are further operable to determine a drum level setpoint to adjust the drum level based at least partially on the drum level to achieve predetermined dynamics of the steam drum.

23. The system of claim 22, wherein the one or more computer processors are further operable to control at least one adjacent unit, wherein the at least one adjacent unit comprises at least one of the following: a bypass valve or the feedwater pump.

24. The system of claim 22, wherein the one or more computer processors are operable to adjust the drum level setpoint during one or more of the following: an initial steam drum streaming, pressure transients in the steam drum, load maneuvering of a plant, and operation of a duct burner.

25. The system of claim 20, wherein the plant parameters include at least an exhaust temperature, a gas turbine exhaust flow, a feedwater temperature, a feedwater pressure, a feedwater flow, a drum superheater temperature, a bypass valve position, a feedwater pump condition, a gas turbine speed, a stream flow from a steam drum, and a drum pressure in the steam drum.

26. The system of claim 20, wherein the one or more computer processors are further operable to:
based at least partially on the identified malfunction in the feedwater pump, issue an alarm; and
provide the alarm and the advisory action to a plant operator via an application programming interface.

27. The system of claim 20, wherein the advisory action is provided for an equipment located downstream with respect to a steam drum.

28. The system of claim 20, wherein the advisory action includes at least one of the following: changing parameters of balance of plant equipment, changing an input flow of the feedwater pump, changing an output flow of the feedwater pump, providing a redundant feedwater pump, or changing a position of a bypass valve.

* * * * *